(12) United States Patent
Farkash

(10) Patent No.: US 6,270,099 B1
(45) Date of Patent: Aug. 7, 2001

(54) RUNNING BOARD STORAGE DEVICE

(76) Inventor: Daniel G. Farkash, 28422 Driver Ave., Agoura Hills, CA (US) 91301

( * ) Notice: Subject to any disclaimer, the term of this patent is extended or adjusted under 35 U.S.C. 154(b) by 0 days.

(21) Appl. No.: 09/377,548

(22) Filed: Aug. 19, 1999

(51) Int. Cl.[7] .................................. B60R 3/00; E06C 5/00
(52) U.S. Cl. .......................... 280/163; 280/769; 296/37.6; 182/127
(58) Field of Search .................................. 280/161, 164.1, 280/163, 769; 296/37.1, 37.6; 182/127; 312/235.1, 324, 325, 327, 328; 49/116, 122, 366

(56) References Cited

U.S. PATENT DOCUMENTS

| | | |
|---|---|---|
| 1,433,810 | 10/1922 | Gibbons . |
| 1,451,202 | 4/1923 | Brown . |
| 1,453,362 * | 5/1923 | Loveland ............................. 296/37.6 |
| 1,488,720 | 4/1924 | Tichey et al. . |
| 1,726,398 | 8/1929 | Limbocker . |
| 1,822,480 * | 9/1931 | Edelmann et al. .................. 296/37.6 |
| 2,598,814 * | 6/1952 | McAfee ............................... 296/37.6 |
| 2,981,554 * | 4/1961 | Mulder et al. ...................... 296/37.6 |
| 3,764,048 * | 10/1973 | Gore ..................................... 296/37.6 |
| 4,570,986 * | 2/1986 | Sams .................................... 296/37.6 |
| 4,674,782 * | 6/1987 | Helber ................................. 296/37.6 |
| 4,696,507 | 9/1987 | Allredge .............................. 296/37.6 |
| 4,948,169 * | 8/1990 | Amundson ........................... 296/37.6 |
| 5,458,343 | 10/1995 | Hanemaayer ...................... 280/164.1 |
| 5,518,158 * | 5/1996 | Matlack ............................... 224/404 |
| 6,129,401 * | 10/2000 | Neag et al. .......................... 296/37.6 |

* cited by examiner

Primary Examiner—Michael Mar
Assistant Examiner—Jeffrey J. Restifo
(74) Attorney, Agent, or Firm—Jack C. Munro

(57) ABSTRACT

A running board storage device being mounted in conjunction with a land vehicle where the running board storage device can be used as a step to facilitate entry and exit through an access door of the vehicle. The storage device may comprise a drawer which is movable between a retracted position where access into the drawer is prevented and an extended position where access into the drawer is permitted. Also, the storage device could have an entry door arrangement where an upper door and a lower door open simultaneously in a "clamshell" opening arrangement. The storage compartment of the running board can be divided into an upper section and a lower section with elongated members such as skis, pipes and the like being capable of being stored in the upper section. The lower section may optionally include one or more drawers.

5 Claims, 5 Drawing Sheets

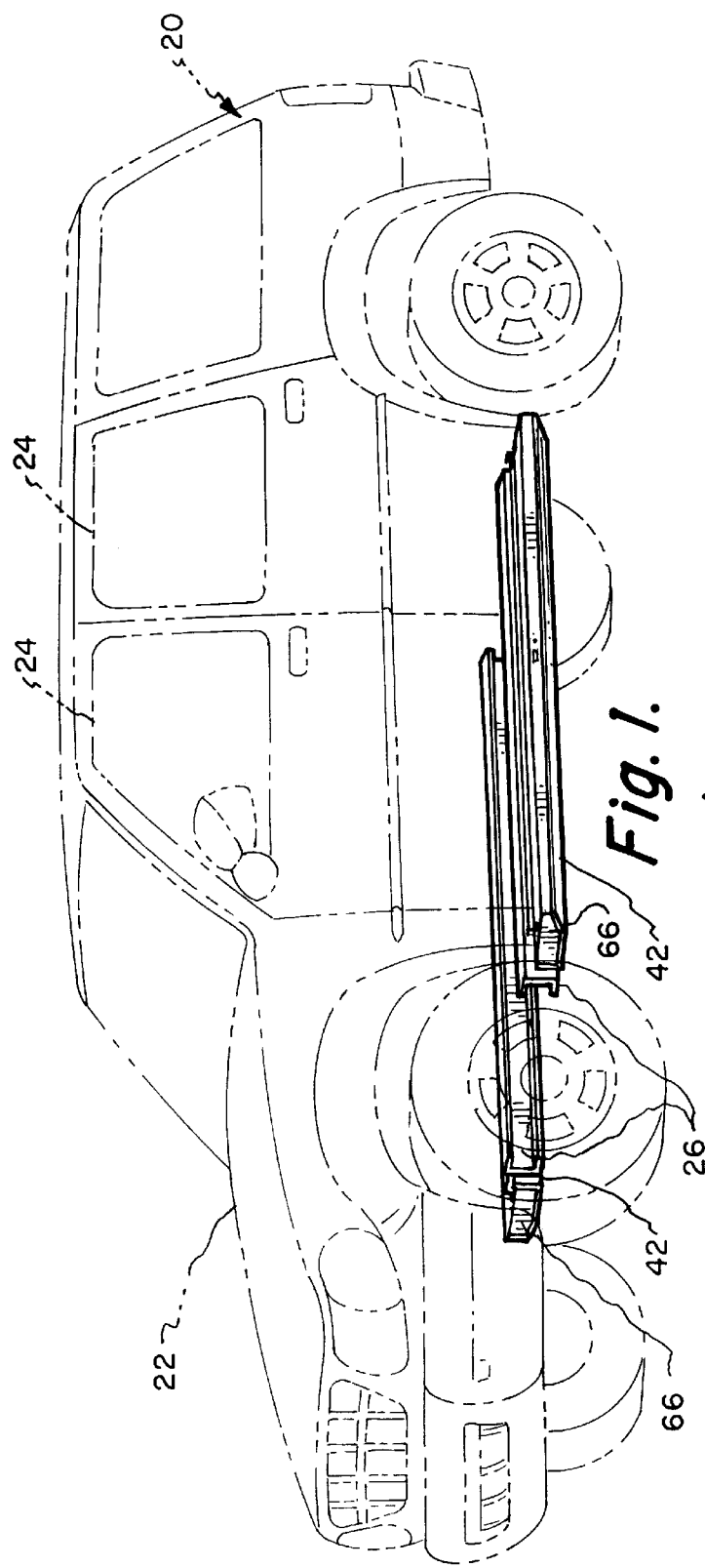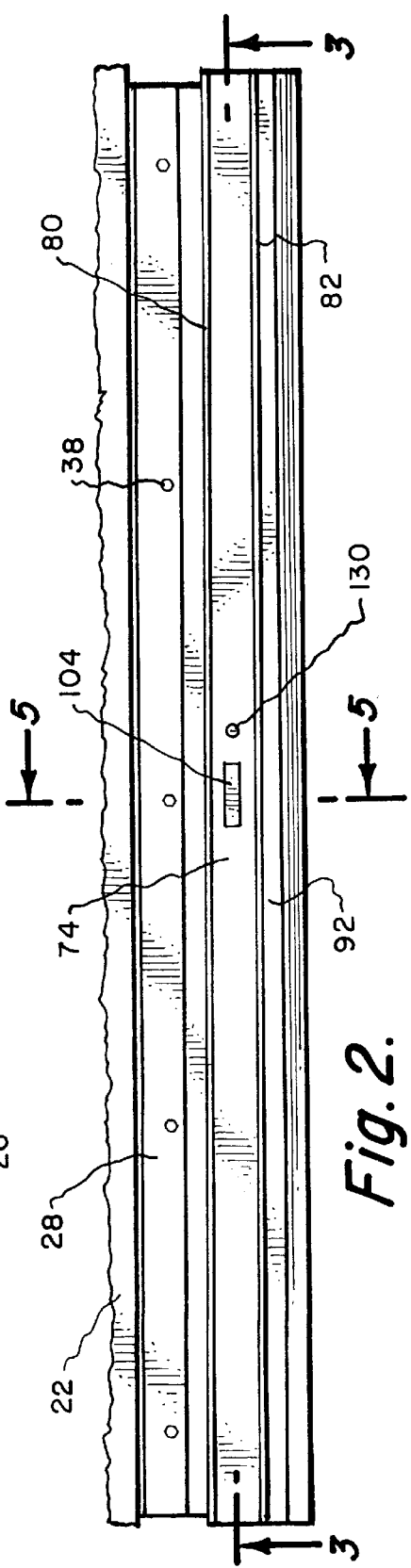

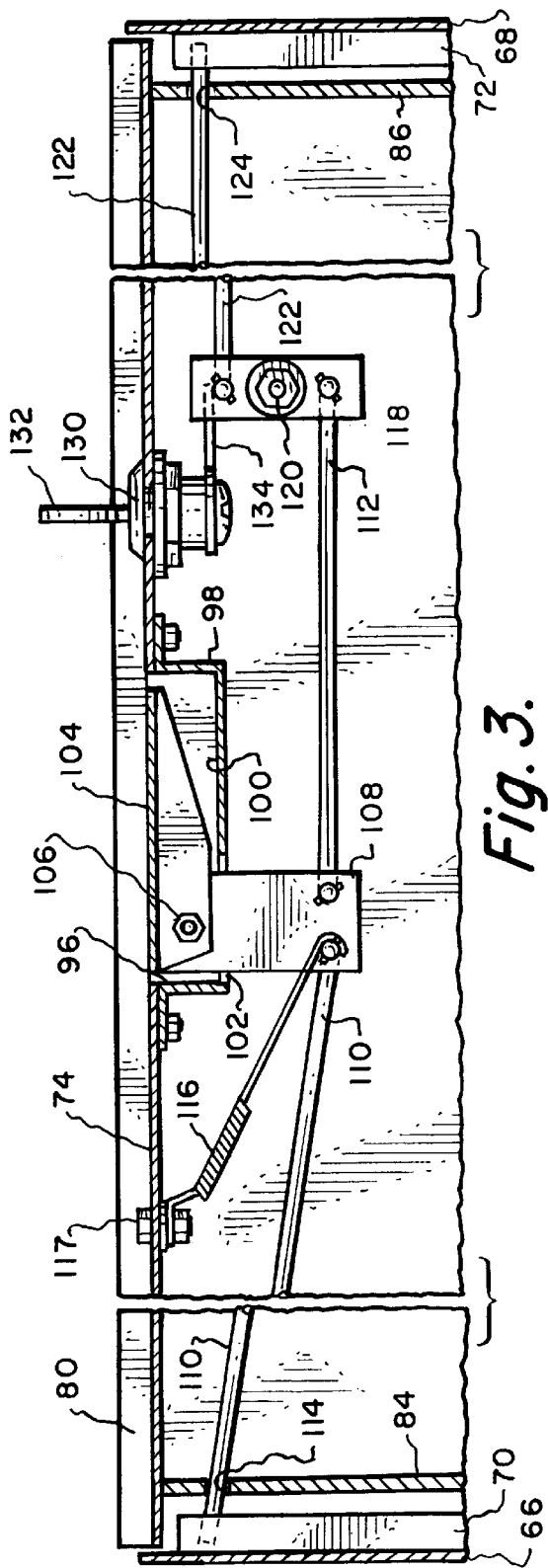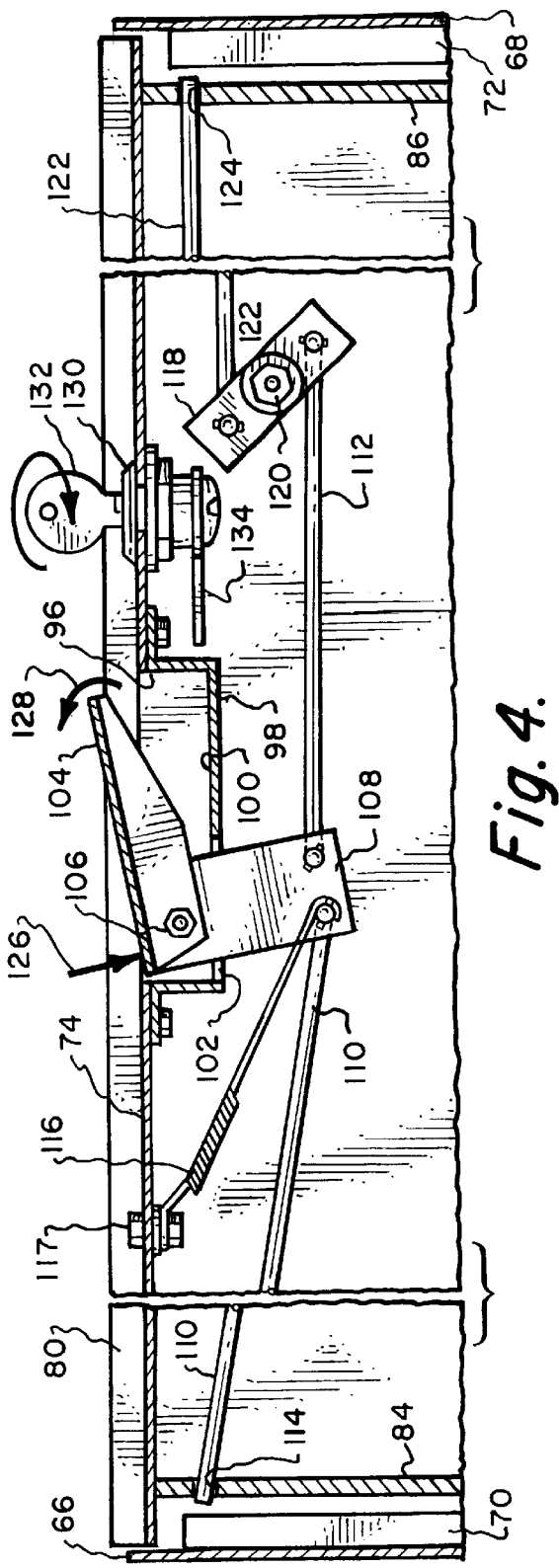

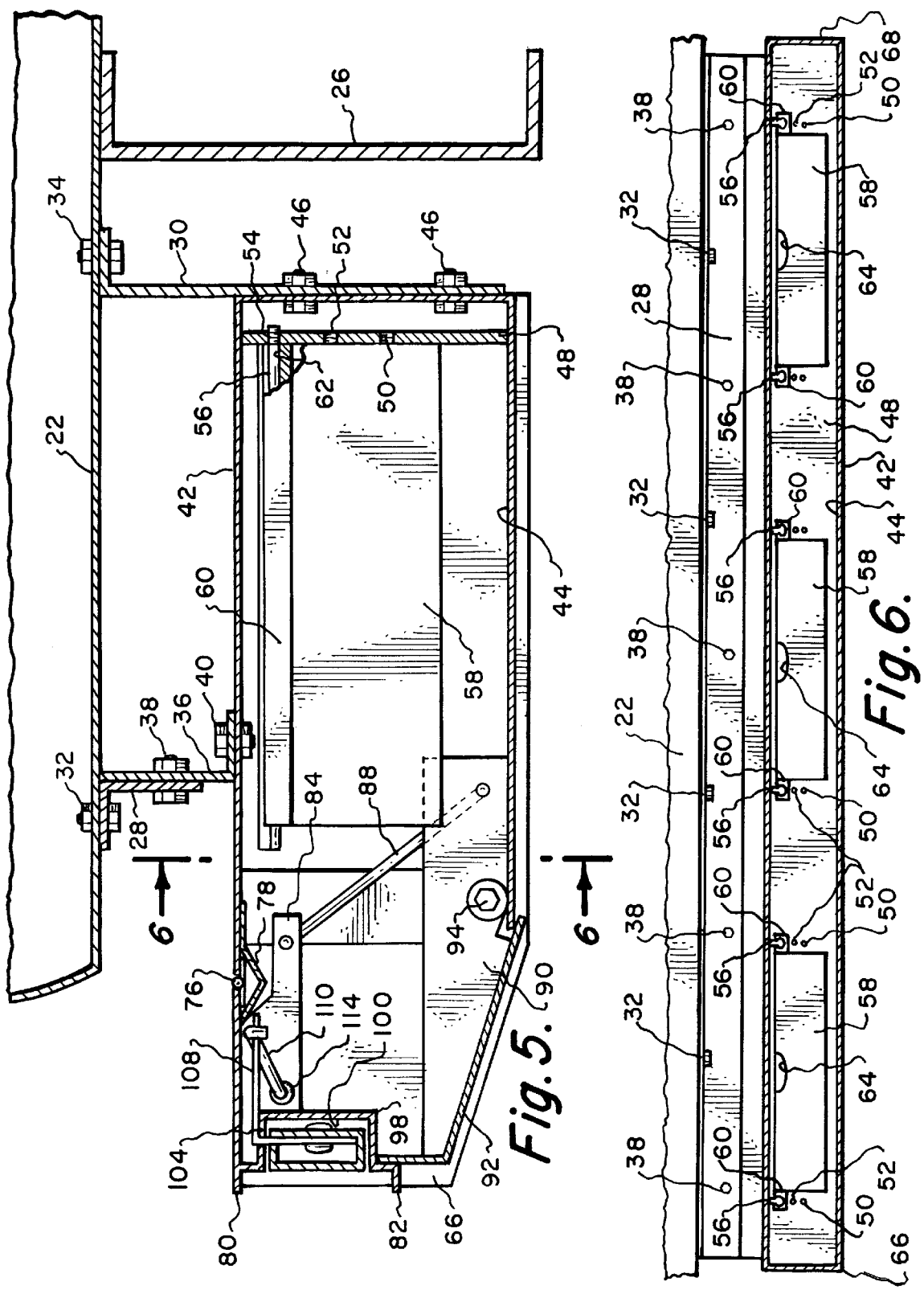

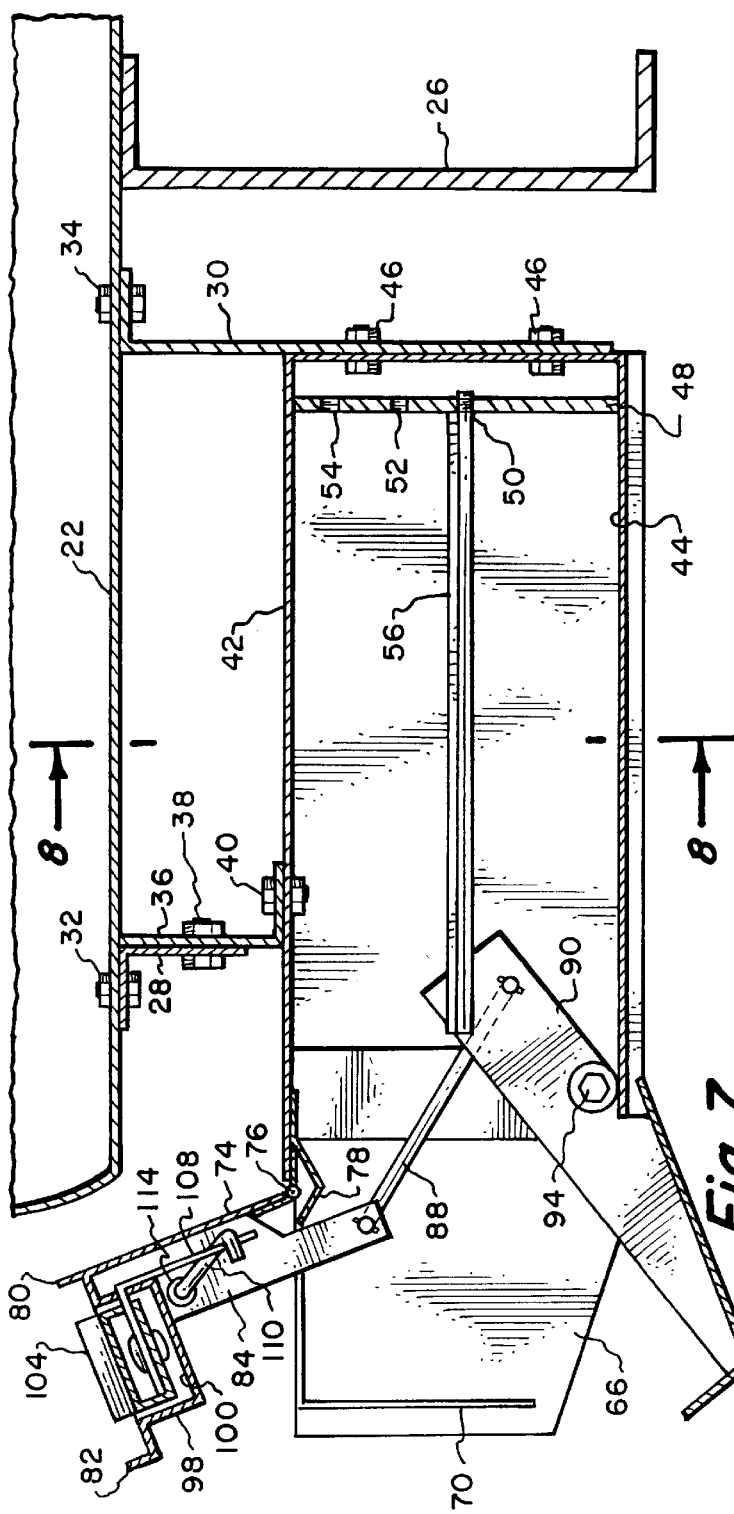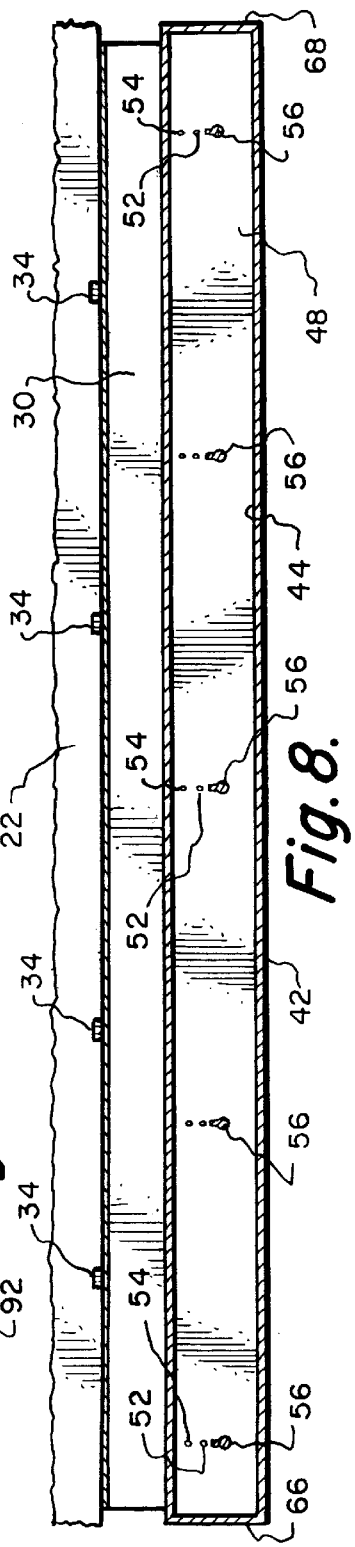

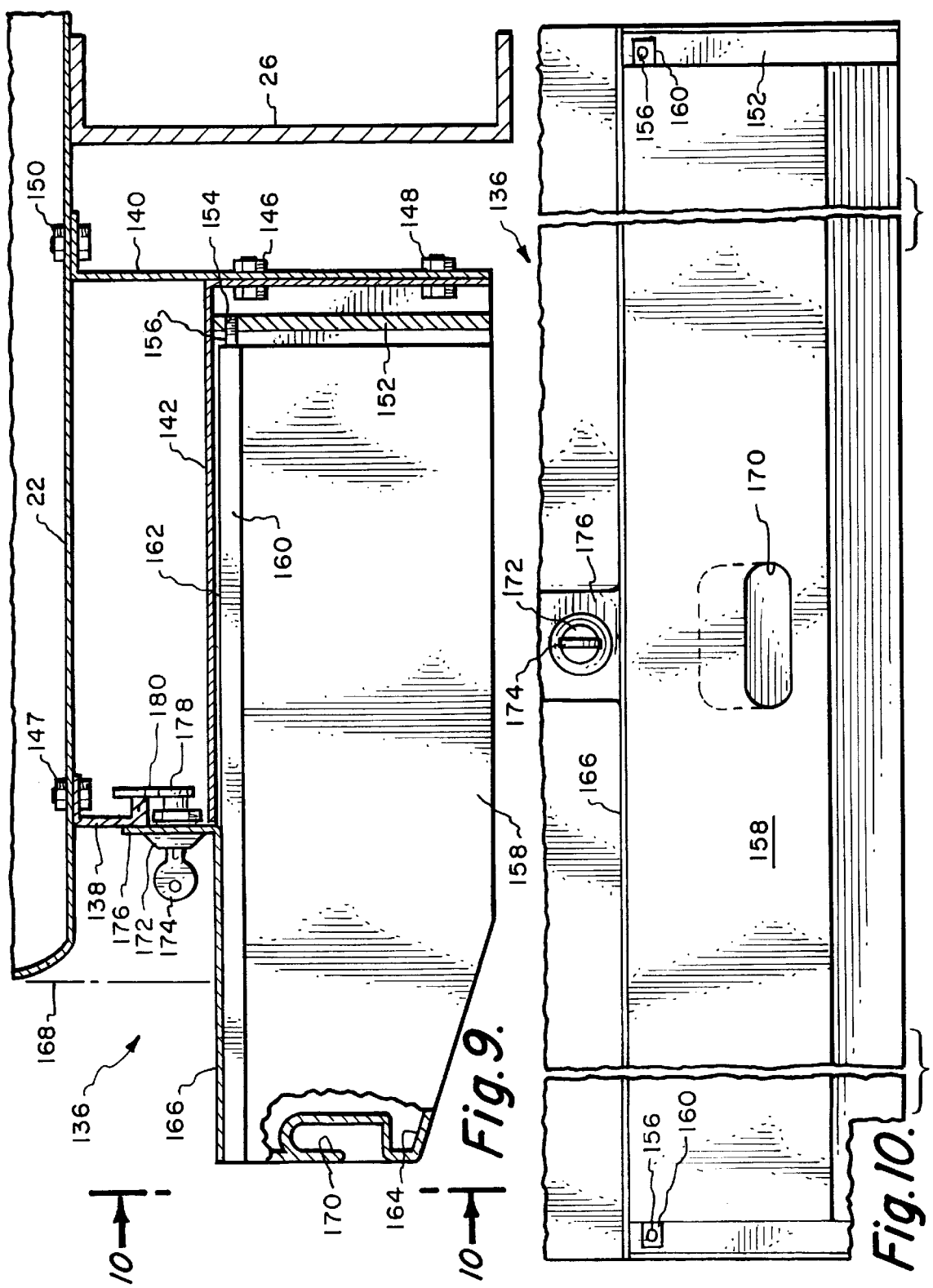

RUNNING BOARD STORAGE DEVICE

BACKGROUND OF THE INVENTION

1) Field of the Invention

The field of this invention relates to storage devices and more particularly to a storage device that is included within a running board of a land vehicle thereby providing a storage compartment which heretofore did not exist.

2) Description of the Prior Art

Personal land vehicles can be characterized as automobiles, pickup trucks, sport utility vehicles and recreational vehicles. Automobiles, at the present time, do not include a running board. A running board generally constitutes no more than a step that is located just below the access door or doors on each side of the land vehicle which can be utilized by humans when entering and exiting the land vehicle which provides for an intermediate location for a user to place one's feet prior to entering the land vehicle after stepping off the ground and when exiting the land vehicle prior to stepping onto the ground. Most pickup trucks, sport utility vehicles and recreational vehicles are raised some distance off the ground. Therefore, for a human to enter or exit the land vehicle requires an initial step of a distance of approximately eighteen inches. This is a significant large step to take for most people and it is for that reason that running boards are utilized to break up that eighteen inch distance to be no greater than about twelve inches.

In connection with pickup trucks and sport utility vehicles, it is normally desirable to include as much storage space as possible. Storage space is always desirable for the storing of tools in connection with one's job, or elongated members such as commonly used in conjunction with certain sports, such as skis for skiing. Normally, a running board is designed to be constructed of metal, fiberglass or plastic and function only as a step. However, in the past it has been known to incorporate some type of a storage container in conjunction with the running board thereby obtaining of additional storage in conjunction with the land vehicle that heretofore was not possible. However, in the past such storage container running boards have not been attractively designed nor constructed in a manner that facilitates maximum usage of the storage ability. Also, such prior art storage devices have been designed to be rather complex by altering chassis itself which inherently increases cost of manufacture and thereby makes a running board storage device relatively expensive.

SUMMARY OF THE INVENTION

The storage device could be in the form of a drawer with the upper surface of the drawer functioning as a step of the running board. The drawer is to be movable relative to a drawer housing that is fixedly secured to the body of the vehicle so the drawer can be moved from a retracted position to an extended position with access within the drawer being provided. Also, the storage compartment could comprise a "clamshell" opening door arrangement. Included within the storage device are a series of cantilevered rods which divides the storage compartment into an upper section and a lower section. It is designed for the upper section to be used to support elongated members such as skis, pipes and other similar types of elongated members, with the lower section to be used to support smaller sized storable items such as tools. A series of drawers may also be mounted within the lower section.

The primary objective of the present invention is to construct a running board for a land vehicle where the running board includes a storage compartment thereby utilizing previously unused space for storage of articles.

Another objective of the present invention is to construct a running board storage device which can open to an extremely wide configuration thereby facilitating entrance into the storage compartment.

Another objective of the present invention is to construct a running board storage device where drawers can be included within the storage device facilitating the storage of small sized articles.

Another objective of the present invention is to construct a running board storage device which can be securely locked preventing unauthorized access into the storage compartment.

Another objective of the present invention is to construct a running board storage device which could be constructed of a lightweight metal, fiberglass or plastic.

Another objective of the present invention is to construct a running board storage device to be mounted in a position partially under the body of the vehicle thereby using normally unused space in conjunction with the vehicle.

Another objective of the present invention is to construct a running board storage device which can be installed as an after market accessory which can be easily bolted to the body of the vehicle not requiring any exterior body alteration or repair.

Another objective of the present invention is to allow for easy access to a pick-up truck bed when entering from the side of the truck.

BRIEF DESCRIPTION OF THE DRAWINGS

FIG. 1 is an isometric view of a pair of running boards storage devices of the first embodiment of this invention depicted as being mounted in conjunction with a typical land vehicle shown in phantom;

FIG. 2 is a front view of the first embodiment of running board storage device of this invention showing a portion of the body of the land vehicle to which the running board storage device is attached;

FIG. 3 is a longitudinal cross-sectional view through the running board storage device of this invention taken along line 3—3 of FIG. 2 showing the running board storage device in the closed and latched position;

FIG. 4 is a view similar to FIG. 3 showing the latching mechanism in the unlatched position with the storage device still being maintained in the closed position;

FIG. 5 is a transverse cross-sectional view through the first embodiment of running board storage device of this invention taken along line 5—5 of FIG. 2;

FIG. 6 is a longitudinal cross-section view through the first embodiment of running board storage device of this invention taken along line 6—6 of FIG. 5;

FIG. 7 is a view similar to FIG. 5 showing the "clamshell" doors of the storage device in the open position;

FIG. 8 is a longitudinal cross-sectional view of the first embodiment of running board storage device of this invention taken along line 8—8 of FIG. 7;

FIG. 9 is a transverse cross-sectional view of the second embodiment of running board storage device of this invention showing such in the retracted position; and FIG. 10 is a front view of the second embodiment of running board storage device of this invention taken along line 10—10 of FIG. 9.

DETAILED DESCRIPTION OF THE PREFERRED EMBODIMENTS

Referring particularly to the drawings, there is shown in phantom lines in FIG. 1 a typical land vehicle 20. The land vehicle 20 has an enclosing body or chassis 22. Normally, the body 22 will be constructed of sheet material. Included within the body 22 are a plurality of access doors 24. The body 22 is mounted on a frame 26.

Within the first embodiment of this invention shown in FIGS. 1–8, there is shown mounted on the body 22 a front mounting bracket 28 and a rear mounting bracket 30. The front mounting bracket 28 is fixedly mounted by a plurality of bolts 32 to the body 22. In a similar manner, the rear mounting bracket 30 is fixedly mounted by a series of bolts 34 to the body 22. The brackets 28 and 30 can each comprise a single elongated member or could comprise a plurality of separate members located in a spaced apart manner.

An L-shaped bracket 36 is fixedly mounted by bolt 38 to the front mounting bracket 28. The L-shaped bracket 36 is then secured by bolt 40 to a storage compartment housing 42. The storage compartment housing 42 is basically rectangular in configuration and will generally be several feet in length and will include a storage compartment 44. The compartment 44 will normally be between six to ten inches in height and about eighteen inches deep. The storage compartment housing 42 is fixedly secured by bolts 46 to the rear mounting bracket 30. Mounted within the storage compartment 44, and fixedly secured to the storage compartment housing 42, is a back wall 48. The back wall 48 extends the entire length of the storage compartment housing 42. Mounted within the back wall 48 are a series of holes with there being shown six in number of such series of holes. The holes within each series comprise a lower hole 50, an intermediate hole 52 and an upper hole 54. Each of the holes 50, 52 and 54 are internally threaded and capable of threadingly connecting with a cantilevered rod 56. The rod 56 is capable of being threadably secured within either hole 50, 52 or 54.

There will normally be a rod 56 that will be connected with a hole of each series of holes 50, 52 and 54. If the rod 56 is mounted within each series of the holes and is located within each lower hole 50, the storage compartment 44 is then divided between a lower section and an upper section with the lower section being about the same height as the upper section. If the rods 56 are mounted in the holes 52, then the lower section is deeper with the upper section being narrower. If the rods 56 are mounted in the holes 54, the upper section becomes almost non-existent with there being only a lower section. The real purpose for the holes 50 and 52 is so that when the rods 56 are mounted within one of the holes 50 and 52 that elongated objects such as skis and pipes can be placed and supported on the cantilevered rods 56. The cantilevered rods 56 can also be used to function as runners for a drawer 58.

Referring particularly to FIG. 6 of the drawings, it is seen that there is a plurality of such drawers with three in number of the drawers 58 being shown. However, it is to be understood that there could be a greater or lesser number of such drawers. Each drawer 58 has glides 60 located on opposite sides of the drawer 58. Each glide 60 has a longitudinal through opening 62 with the rod 56 to be movably locatable within each through opening 62. Thus, the drawer 58 is supported on a pair of the cantilevered rods 56 with the cantilevered rods 56 functioning as drawer runners. This will permit the drawer 58 to be grasped by handle 64 and pulled in an outward direction so as to expose the internal compartment of the drawer, which is not shown, to facilitate removal of small storagable articles, which are not shown. The rods 56 may be circular in transverse cross-section as shown in FIGS. 9 and 10 or may have a keyhole shape as is shown in FIGS. 5–8.

The storage compartment housing 42 includes side extensions 66 and 68. Formed on the inner surface of the side extensions 66 is an L-shaped flange 70. Similarly formed on the inside surface of the side extension 68 is an L-shaped flange 72. An upper door 74 extends almost the entire length of the storage compartment 44. The upper door 74 is hingedly connected by piano hinge 76 to the storage compartment housing 42. Attached to the storage compartment housing 42 is a V-shaped elongated member 78 which extends the entire length of the piano hinge 76. The purpose of the member 78 is to catch any rainwater which passes through the hinge 76 and prevent the rainwater from entering into the storage compartment 44. Any collected rainwater within the member 78 is discharged at the open ends thereof directly adjacent the side extensions 66 and 68. The upper door 74 has an upward forwardly facing lip 80 and a lower forwardly facing lip 82. The lips 80 and 82 function merely as graspable areas to facilitate opening and closing of the upper door 74 about the hinge 76.

At one end of the upper door 74 there is fixedly mounted thereto a gusset 84. At the opposite side edge of the upper door 74 there is similarly mounted a gusset 86. Gussets 84 and 86 each constitute a thin plate which is welded or otherwise integrally formed to the upper door 74. Gusset 84 is connected by a pivot rod 88 to a gusset 90. The pivot rod 88 is also pivotally connected to the gusset 90. It is to be understood that there is a similar pivot rod connected to the gusset 86 which in turn connects to a separate gusset, which is not shown, similar to gusset 90. The gusset 90 and the similar gusset that is not shown is integrally connected to a lower door 92. The lower door 92 is hingedly mounted by a hinge rod 94 to the storage compartment housing 42. The result is when the upper door 74 is moved from a closed position, shown in FIG. 5, to the open position, shown in FIG. 7, that the lower door 92 is also caused to move from the closed position, shown in FIG. 5, to the open position, shown in FIG. 7. The pivoting of the lower door 92 is opposite in direction to the pivoting of the upper door 74. The result is that the doors 74 and 92 open and close in a "clamshell" type arrangement. This "clamshell" type arrangement produces a wide frontal entry opening into the storage compartment 44. This wide entry opening facilitates the insertion of objects into and out of the storage compartment 44, especially elongated objects such as skis, pipes or rods.

There is a latching mechanism which is utilized to retain the upper door 74 and the lower door 92 in the closed position. This latching mechanism is as follows: Formed within the upper door 74 is a rectangularly shaped opening 96. Mounted on the inside surface of the upper door 74 and located about the opening 96 is a handle housing 98. Handle housing 98 includes a rectangularly shaped recess 100. The handle housing 98 includes a hole 102. A handle 104 is mounted within the recess 100 with the handle 104 being pivotally mounted by pivot rod 106 to the handle housing 98. The outer surface of the handle 104 is to be located flush with the outer surface of the upper door 74, as is clearly shown in FIG. 3 of the drawings, when the handle 104 is in the inner position. Fixedly mounted to the handle 104 is a plate 108. Plate 108 extends through hole 102 to be located within the confines of the storage compartment 44. The plate 108 has pivotally attached thereto elongated push rods 110 and 112. The outer end of push rod 110 passes through hole 114 formed within the gusset 84. The outer end of the push rod 110 is pre-chosen so as to extend underneath L-shaped flange 70 and be located directly adjacent side extension 66 when handle 104 is in the non-operating position. Coil spring 116 is mounted between plate 108 and the upper door 74. The function of the coil spring 116 is to tend to maintain the handle 104 in its non-operating position as shown in FIG. 3. The spring 116 is mounted by bolt fastener 117 to the upper door 74.

Elongated push rod 112 is pivotally mounted to pivot bar 118. Pivot bar 118 is pivotally mounted by pivot pin 120 to the upper door 74. Pivotally attached to the side of the pivot bar 118, which is diametrically opposite from the attachment position of push rod 112 to the pivot bar 118, is an elongated push rod 122. Elongated push rod 122 has an outer end which passes through hole 124 formed within gusset 86. The outer end of push rod 122 is adapted to be mounted directly underneath L-shaped flange 72 when handle 104 is in the non-operating position. The locating of push rod 110 under L-shaped flange 170 and push rod 122 under L-shaped flange 72 locks the position of the upper door 74 in the closed position and also the lower door 92 in its closed position since the lower door 92 moves only in conjunction with the upper door 74 caused by the pivot rod 88 and the pivot rod which is not shown on the opposite side of the storage compartment 44. When the handle 104 is pivoted in the direction of arrows 126 and 128 of FIG. 4 by manually pushing in the direction of arrow 126 and pulling in the direction of arrow 128, the plate 108 is pivoted counterclockwise from the position shown in FIG. 3 to the position shown in FIG. 4. This causes the push rod 110 to move to the right which displaces the outer end of the push rod 110 from the L-shaped flange 70. Push rod 112 is also moved to the right which causes the pivot bar 118 to pivot counterclockwise. This causes the push rod 122 to be moved to the left displacing the outer end of the push rod 122 from the L-shaped flange 72. The upper door 74 is now capable of being pivoted to the position shown in FIG. 7 which will also result in the lower door 92 being pivoted to its position in FIG. 7.

In order to prevent unauthorized access to within the storage compartment 44, there is mounted a key operated locking mechanism 130 within the upper door 74. The key operated locking mechanism 130 is capable of being pivoted by means of key 132. The portion of the key operated locking mechanism 132 that is located within the storage compartment 44 includes a pawl 134. This pawl 134 can be pivoted between a forward position, as shown in FIG. 3, to a rear position as shown in FIG. 4 by operating of the locking mechanism 130. With the pawl 134 in the rear position as shown in FIG. 4, the pawl 134 is spaced from the pivot bar 118 permitting the pivot bar 118 to freely pivot when handle 104 is moved to its operating position. However, if the locking mechanism 130 is in the locked position, the pawl 134 is pivoted to abut against the pivot bar 118. Any attempt to move the handle 104 with the pawl 134 located against the pivot bar 118 will result in the handle 104 being not capable of being moved to the operating position and will remain in the position shown in FIG. 3.

Referring particularly to FIGS. 9 and 10, there is shown the second embodiment 136 of this invention. The second embodiment 136 utilizes a front mounting bracket 138 and a rear mounting bracket 140 each of which are fixedly mounted to the body 22. The bracket 140 is shown being located directly adjacent to but spaced from the frame 26. It is to be noted that the brackets 138 and 140 are located beneath the body 122. There is a drawer housing 142 which is fixedly mounted to the mounting brackets 138 and 140. The drawer housing 142 is attached to the rear mounting bracket 140 by means of bolt fasteners 146 and 148. Bracket 138 is attached to the body 22 by means of bolt fastener 147.

The mounting bracket 140 is fixedly secured to the body 22 by means of bolt fastener 150.

Fixedly mounted to the drawer housing 142 is a back wall 152. Mounted within the back wall 152 at spaced intervals are a series of threaded holes 154. The threaded holes 154 are located a prescribed distance apart, generally no more than a couple of feet apart. Within each threaded hole 154 is mounted a threaded rod 156. Mounted on each side wall of a drawer 158 is a drawer glide 160. Each drawer glide 160 is mounted directly adjacent the top edge 162 of the drawer 158. The top edge 162 is designed to be open to provide access to within the internal chamber 164 of the drawer 158. A portion of the top edge 162 is closed by means of a step plate 166. The step plate 166 is located in the forward portion of the drawer 158 which is the portion of the drawer 158 that protrudes exteriorly of the side plane 168 of the body 22. This step plate 166 is to function as a step for a human user when entering and exiting from within the body 22 of the land vehicle 20. In other words, when a human exits the body 22, the human will first place his or her feet on the step 136 prior to moving from the step plate 166 to the ground and in reverse from the ground to the step plate 166 and then into the body 22.

Each of the drawer glides 160 constitutes an elongated solid member that has an elongated through hole which is just slightly larger than the diameter threaded rod 156. Therefore, when a threaded rod 156 is mounted within the hole of the drawer glide 160, it is to be understood that there is a sliding action that is achieved permitting movement of the drawer 158 from the retracted position, shown in FIG. 9, to an extended position which would be where the drawer 158 is moved significantly to the left in FIG. 9 exposing the top edge 162 and therefore providing access to within the drawer 158 in order to permit entry of articles to be stored or exit of articles from the drawer 158. In all probability, there will be a plurality of the drawers 158 that will be located side-by-side that will form a single running board of the land vehicle 20. Each drawer 158 is to be movable to an extended position by a human inserting his or her hand within handle opening 170 which will then permit movement of the drawer 158 from the retracted position to the extended position. It is to be noted that the threaded rods 156 are cantileverly supported on the back wall 152.

When the drawer 158 is in the retracted position, it may be desirable to lock the drawer 158 and prevent unauthorized opening movement of the drawer 158. In order to achieve this, there is mounted a key operated locking mechanism 172 which is operated by a key 174 within upright flange 176 which is integrally formed and located at a right angle to the step plate 166. There is to be an upright flange 176 for each locking mechanism 172 of each drawer 158. The locking mechanism 172 connects to a pawl 178 which can be turned to abut against protrusion 180 which is integrally connected to the front mounting bracket 138. With the pawl 178 abutting against protrusion 180, the drawer 158 is locked in position and withdrawal of the drawer 158 is prevented. When the key is turned about ninety degrees, the pawl 178 will be moved to a displaced position from protrusion 180 which will permit the drawer 158 to be moved to an extended position providing access to within the drawer 158.

What is claimed is:

1. In combination with a land vehicle having a body and a set of wheels located at each side of said body, an access door mounted within said body located between each said set of wheels on each said side of said body with their being two in number of said access doors, a running board mounted on said body and extending in a longitudinal direction and located between one said set of wheels and located beneath a said access door, said running board being adapted to function as a step for a human when entering and exiting said body, said running board includes;

a housing mounted on said running board;

an article storage compartment formed within said housing, an entry door arrangement mounted on said running board, said entry door arrangement being movable between a closed position and an open position, said closed position preventing access into said article storage compartment, said open position permitting access into said article storage compartment, said entry door arrangement comprising an upper door and a lower door connected together, said upper door being pivotally mounted about a first pivot axis to said housing, said lower door being pivotally mounted about a second pivot axis to said housing, both said first pivot axis and said second pivot axis being parallel to said longitudinal direction, movement to said open position causes said upper door and said lower door to move in a "clamshell" opening arrangement with said upper door moving toward said body and said lower door moving away from said body.

2. The combination as defined in claim 1 including:

latching means connecting said upper door and said lower door, said latching means functioning to fix together said upper door and said lower door when in said closed position.

3. The combination as defined in claim 2 wherein:

locking means connecting said upper door and said lower door, said locking means to be actuatable to prevent operation of said latching means and maintaining of said entry door arrangement in said closed position.

4. The combination as defined in claim 1 including:

a series of cantilevered rods being mounted within said article storage compartment, said rods being horizontally spaced apart dividing said article storage compartment into an upper section and a lower section, whereby elongated members can be stored within said storage compartment by resting on said rods.

5. The combination as defined in claim 4 wherein:

said lower section including a drawer mounted on said rods using said rods as drawer glides.

\* \* \* \* \*